US009579940B2

(12) United States Patent
Mauerman et al.

(10) Patent No.: US 9,579,940 B2
(45) Date of Patent: Feb. 28, 2017

(54) ROTATING RETAINER CLIP FOR WEIGHT DISTRIBUTION HITCH SPRING ARM RETAINING PIN

(71) Applicant: Progress Mfg. Inc., Provo, UT (US)

(72) Inventors: Kenneth D. Mauerman, Orem, UT (US); Jed K. Anderson, Lindon, UT (US)

(73) Assignee: Progress Mfg. Inc., Provo, UT (US)

(*) Notice: Subject to any disclaimer, the term of this patent is extended or adjusted under 35 U.S.C. 154(b) by 0 days.

(21) Appl. No.: 14/188,594

(22) Filed: Feb. 24, 2014

(65) Prior Publication Data

US 2016/0082794 A1 Mar. 24, 2016

Related U.S. Application Data

(60) Provisional application No. 61/768,316, filed on Feb. 22, 2013.

(51) Int. Cl.

| B62D 53/00 | (2006.01) |
|---|---|
| B60D 1/02 | (2006.01) |
| B60D 1/34 | (2006.01) |
| B60D 1/24 | (2006.01) |

(52) U.S. Cl.
CPC .............. B60D 1/34 (2013.01); B60D 1/247 (2013.01)

(58) Field of Classification Search
CPC .................................. B60D 1/34; B60D 1/247
USPC .................. 280/515, 405.1, 455.1; 16/38
See application file for complete search history.

(56) References Cited

U.S. PATENT DOCUMENTS

| 399,813 | A | 3/1889 | Allen |
|---|---|---|---|
| 3,471,170 | A | 10/1969 | Rendessy |
| 3,801,133 | A | 4/1974 | Thompson |
| 3,957,286 | A | 5/1976 | Goodwin |
| 4,165,885 | A | 8/1979 | Good et al. |
| 4,212,483 | A | 7/1980 | Howard |
| 4,306,734 | A | 12/1981 | Swanson et al. |
| 4,549,746 | A | 10/1985 | Hager |
| 5,660,409 | A | 8/1997 | Hensley |
| 5,707,071 | A | 1/1998 | Prestidge et al. |
| 5,716,042 | A | 2/1998 | Derviller |
| 5,725,231 | A | 3/1998 | Buie |
| 5,823,268 | A | 10/1998 | Barnes |
| 5,921,699 | A * | 7/1999 | Olson ...................... B60D 1/02 280/509 |
| 5,951,036 | A | 9/1999 | Sargent |
| 6,142,500 | A | 11/2000 | Sargent |
| 6,474,675 | B1 | 11/2002 | Bockman et al. |
| 6,629,701 | B1 | 10/2003 | Colibert |
| 6,722,682 | B2 | 4/2004 | Valliere et al. |

(Continued)

Primary Examiner — Tony Winner
(74) Attorney, Agent, or Firm — Clayton, Howarth & Cannon, P.C.

(57) ABSTRACT

A trailer hitch system for equalizing trailer loads and reducing trailer sway. The trailer hitch system may include spring bars that may extend from a hitch head. The spring bars may be attached to the trailer using rigid brackets that reduce swinging of the spring bars. The rigid brackets may include an upward extending portion for attaching to the trailer tongue, and a lateral extending portion for receiving the spring bars thereupon. Pins may be utilized to secure the spring bars on the lateral extending portion of the brackets. The pins may each include a spring loaded clip that is rotatably between an unlocked position and a locked position.

24 Claims, 9 Drawing Sheets

(56) References Cited

U.S. PATENT DOCUMENTS

| | | |
|---|---|---|
| 6,860,501 B2 | 3/2005 | Schmidt et al. |
| 7,025,370 B2 | 4/2006 | Anderson et al. |
| 7,137,643 B1 | 11/2006 | Hsueh |
| 7,261,312 B1 | 8/2007 | Joplin |
| 7,303,205 B2 | 12/2007 | Richardson et al. |
| 7,416,206 B2 * | 8/2008 | Buerkle ............... B60D 1/02 280/504 |
| 7,530,592 B2 * | 5/2009 | Heitlinger ............ B60D 1/02 213/188 |
| 7,967,320 B2 | 6/2011 | Anderson et al. |
| 8,628,107 B2 | 1/2014 | Harper et al. |
| 8,833,789 B2 * | 9/2014 | Anderson ............ B60D 1/065 280/405.1 |
| 2005/0230932 A1 | 10/2005 | Richardson et al. |
| 2006/0049612 A1 * | 3/2006 | Anderson ............. B60D 1/00 280/405.1 |
| 2006/0261573 A1 | 11/2006 | Hsueh |
| 2008/0122198 A1 | 5/2008 | Anderson |
| 2008/0143078 A1 | 6/2008 | McCoy et al. |
| 2008/0238038 A1 | 10/2008 | Anderson et al. |
| 2008/0284133 A1 | 11/2008 | Lair et al. |
| 2011/0099846 A1 * | 5/2011 | Fischer ............... A43B 5/0433 36/117.1 |
| 2013/0056956 A1 | 3/2013 | Mauerman et al. |

\* cited by examiner

ROTATING RETAINER CLIP FOR WEIGHT DISTRIBUTION HITCH SPRING ARM RETAINING PIN

CROSS-REFERENCE TO RELATED APPLICATIONS

This application claims the benefit of U.S. Provisional Application No. 61/768,316, filed Feb. 22, 2013, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Invention

The present disclosure relates generally to trailer hitch systems, and more particularly, but not necessarily entirely, to trailer hitch systems for reducing trailer sway.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, positioned on a front of the trailer tongue, may engage the ball hitch in a loose friction fit, and may be secured to the ball in preparation for towing.

One of the biggest safety concerns with towing trailers is that the trailers may sway, leading to loss of control of the towing vehicle. A number of factors may contribute to sway, including: side winds, passing vehicles, quick lane changes, uneven roads and sudden stops. Some trailer hitches may not handle these situations well and may often exacerbate the sway problem making driving even more stressful and difficult.

Another common problem encountered when towing a trailer is highway hop, or the bouncing that often happens to trailers on uneven roadways. This problem may be caused by uneven weight distribution. With ordinary ball-type hitches, most of the trailer tongue weight may be carried on the back axle of the tow vehicle. This may raise the front end of the tow vehicle. The uneven distribution of weight may make steering control more difficult, especially during emergency situations. Weight distribution allows a trailer and tow vehicle to be level. Risks associated with driving a trailer without a weight distribution hitch may include loss of steering control, braking difficulties, and hitch dragging.

Some hitches include load equalizing systems utilizing spring arms or bars to distribute loads and allow the towing vehicle and trailer to remain level. One end of the spring arms may be attached under the ball hitch and hitch head. The spring arms may extend from the hitch head towards the trailer, and may be joined to the trailer tongue using chains and/or brackets. The end of the spring arms opposite the hitch head may be lifted or loaded to place an upward force on the hitch head to thereby equalize the load exerted on the trailer hitch. Various mechanisms are known for use in association with a trailer hitch to reduce side sway of the trailer as well as to equalize loads. Some prior art embodiments of the brackets for joining the spring bars to the trailer tongue have been formed as rigid members or brackets. An L-shaped pin is often utilized to secure the spring bars onto the brackets.

Referring now to FIG. 1, a side view is shown of a towing vehicle 10 towing a trailer 12 with a trailer hitch 14. It will be understood that the towing vehicle 10 may be any variety of vehicle known in the art, such as a truck, tractor or car, or any other variety of on-road or off-road vehicle, for example. Likewise, the principles of the present disclosure may be utilized with any variety of trailer 12 known in the art, such as camping trailers, boat trailers or cargo trailers, for example.

As is known in the art, the load from the trailer 12 may force the rear end of the towing vehicle 10 down and raise the front end of the towing vehicle 10. The uneven distribution of weight may make steering the towing vehicle 10 more difficult and may cause braking difficulties or the prior art hitches to drag on the ground. Load equalizing systems may be used to distribute the load created by the trailer 12 on the towing vehicle 10 to thereby make the trailer 12 and towing vehicle 10 more level, as shown in FIG. 1.

As shown in FIG. 2, the trailer 12 may include a tongue 16 extending at a forward end of the trailer 12. A coupler 18 may be located on an end of the tongue 16 for receiving a ball 20 of the hitch 14, in a manner known in the art. The ball 20 may be disposed on a hitch head 22 which may be attached to the tow vehicle 10 through a connector 24. A spring bar 26 may be joined to the hitch head 22 at one end, and to the trailer tongue 16 at an opposing end portion using a bracket 28. It will be understood that two spring bars 26 may be used, one on each side of the trailer 12. The spring bars 26 may be configured to provide an upward force on the hitch head 22 to equalize the distribution of the load and allow the towing vehicle 10 and trailer 12 to be more level. The spring bars 26 may also be beneficial for reducing sway of the trailer 12.

Referring now to FIG. 3, a perspective view is shown of one embodiment of the prior art hitch system. It will be understood that the hitch system 14 may be attached to the tow vehicle 10 and trailer 12 as shown in FIG. 1, using mounting assemblies 40. The hitch 14 may include the hitch head 22 for receiving the ball 20. It will be understood that the ball 20 may be attached to a trailer 12 in a manner known in the art. Similarly, the hitch 14 may include a connector 24 for attachment to a tow vehicle 10.

The hitch 14 may include spring bars 26 for applying an upward force on the hitch head 22 as discussed above. It will be understood that the spring bars 26 may be formed in various different configurations in accordance with the principles of the present disclosure. For example, one embodiment of the spring bars 26 may be formed of elongate members having a rectangular cross-sectional shape. The spring bars 26 may have various different configurations.

As mentioned, the free ends of the spring bars 26 may be supported by brackets 28. The brackets 28 may be mounted to the tongue of a trailer. The brackets 28 may each include an L-shaped member 30. Each of the L-shaped members 30 may include a vertical portion 32 and a horizontal portion 34. The free ends of the spring bars 26 may be loaded onto the horizontal portions 34 of the L-shaped members 30.

Inverted L-shaped pins 36 may be utilized to secure the spring bars 26 onto the horizontal portions 34. In particular, the L-shaped pins 36 may include a short leg 36A and a long leg 36B. The long legs 36B of the pins 36 may be inserted into pin receiving holes in the horizontal portions of the brackets 28. Spring clips 38 inserted through retaining holes 39 in the long legs 36B may prevent the pins 36 from falling out.

The use of the spring clips 38 to secure the pins 36 have several drawbacks. First, spring clips 38 are difficult to install because the retaining holes 39 are typically only 12 to 18 inches off of the ground. That is, the retaining holes 39 are out of sight causing a user to have to stoop or kneel down to see the retaining holes 39 and align the clip 38 with the holes 39. Second, because of the proximity of the retaining holes 39 to the horizontal portions 34 of the L-shaped members 30, users often hit the portions 34 when installing the clips 38. Third, the bent portion of the pins 36 may undesirably rest on the spring bars 26. Lastly, the use of the pins 36 may cause loud clattering due to road vibrations.

Thus, despite the advantages of the known trailer hitches, improvements are still being sought. The prior art is characterized by several disadvantages that may be addressed by the present disclosure. The present disclosure minimizes, and in some aspects eliminates, the failures of the prior art, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
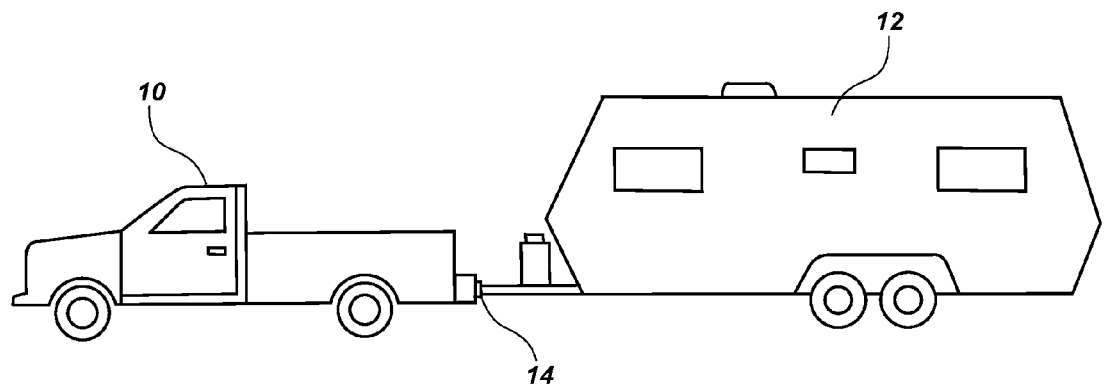
FIG. 1 is a side view of a tow vehicle towing a trailer using a trailer hitch, as known in the prior art.
Figure 2:
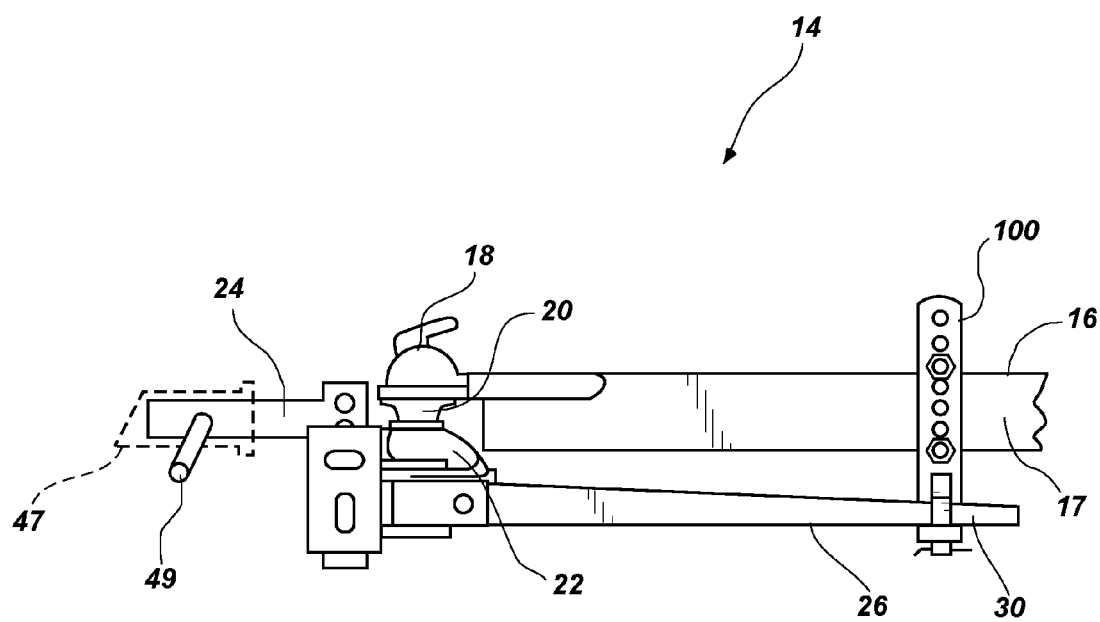
FIG. 2 is a side view of one embodiment of a trailer hitch attached to a break-away portion of a trailer tongue, as known in the prior art.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structures and methods for providing a sway control hitch are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

Figure 3:
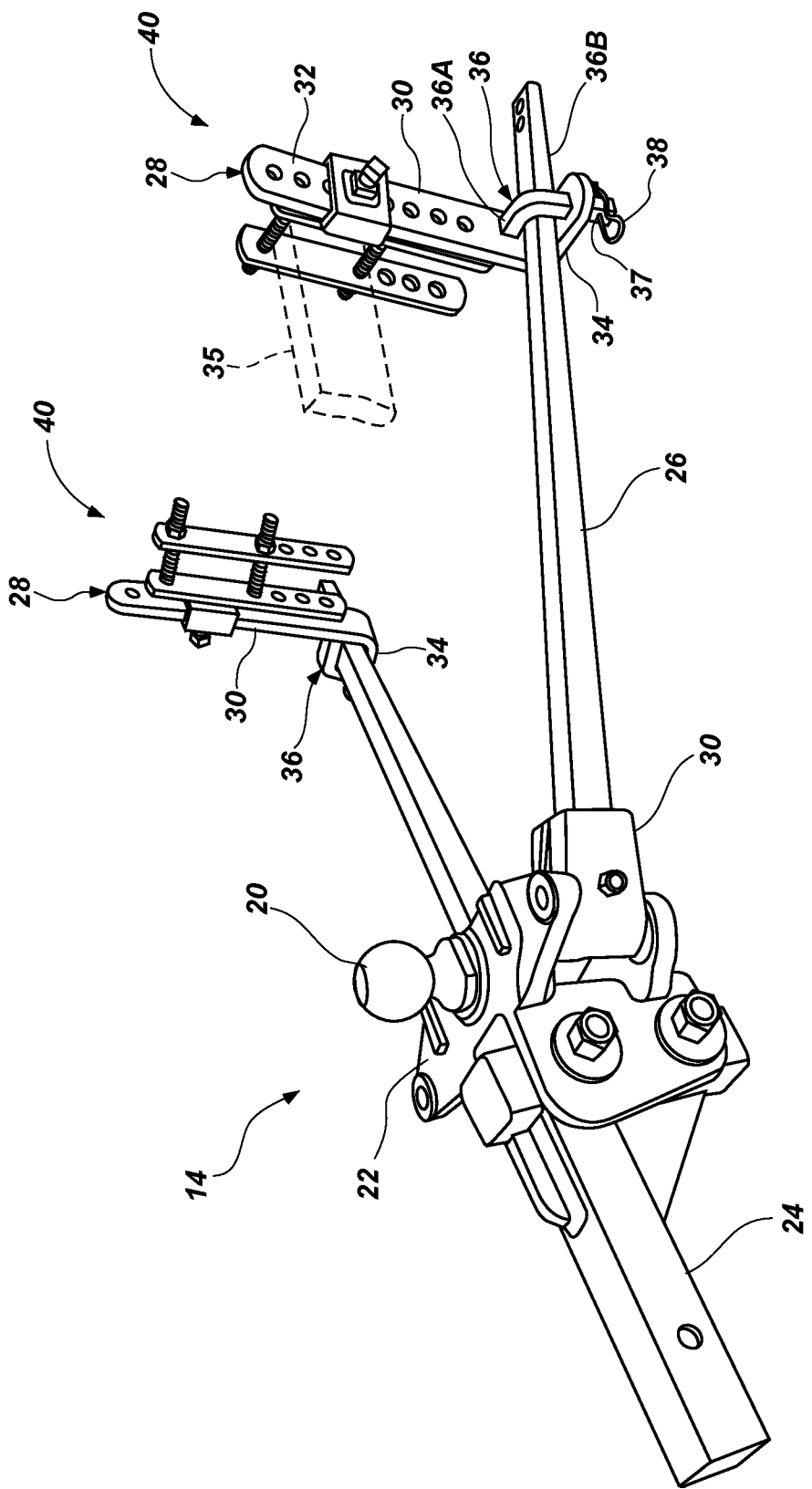
FIG. 3 is a perspective view of a trailer hitch in accordance with the principles of the present disclosure, as known in the prior art.

Referring now to FIGS. 4-8, there is depicted an embodiment of a pin 100 for securing a spring bar extending from a hitch head to a horizontal support member 35 (see FIG. 3) of, or extending from, a trailer frame. The pin 100 may comprise a shaft member that may include long leg 102 and a short leg 104. The long leg 102 and the short leg 104 may meet at approximately a ninety-degree angle such that the pin 100 forms an inverted L-shaped. In an embodiment, the shaft member may have a rectangular cross section. In an embodiment, the shaft member may have a circular cross section or any other shaped cross section.

A rotating spring clip or clip member 106 may be coupled to the long leg 102 of the pin 100. In particular, as perhaps best observed in FIG. 8, the clip 106 may be hooped shaped and may include a frame 109 that defines an open interior or aperture 111. The frame 109 may include a first side 106A, a second side 106B, a third side 106C, and a fourth side 106D. The first side 106A and the second side 106B may be opposing and parallel to each other. The third side 106C and the fourth side 106D may be opposing and parallel to each other.

In addition, the frame 109 may extend between a first terminal end 120 and a second terminal end 122. The first terminal end 120 and the second terminal end 122 may be located on the second side 106B of the frame 109. The first terminal end 120 and the second terminal end 122 may be separated by a small gap.

Figure 5:
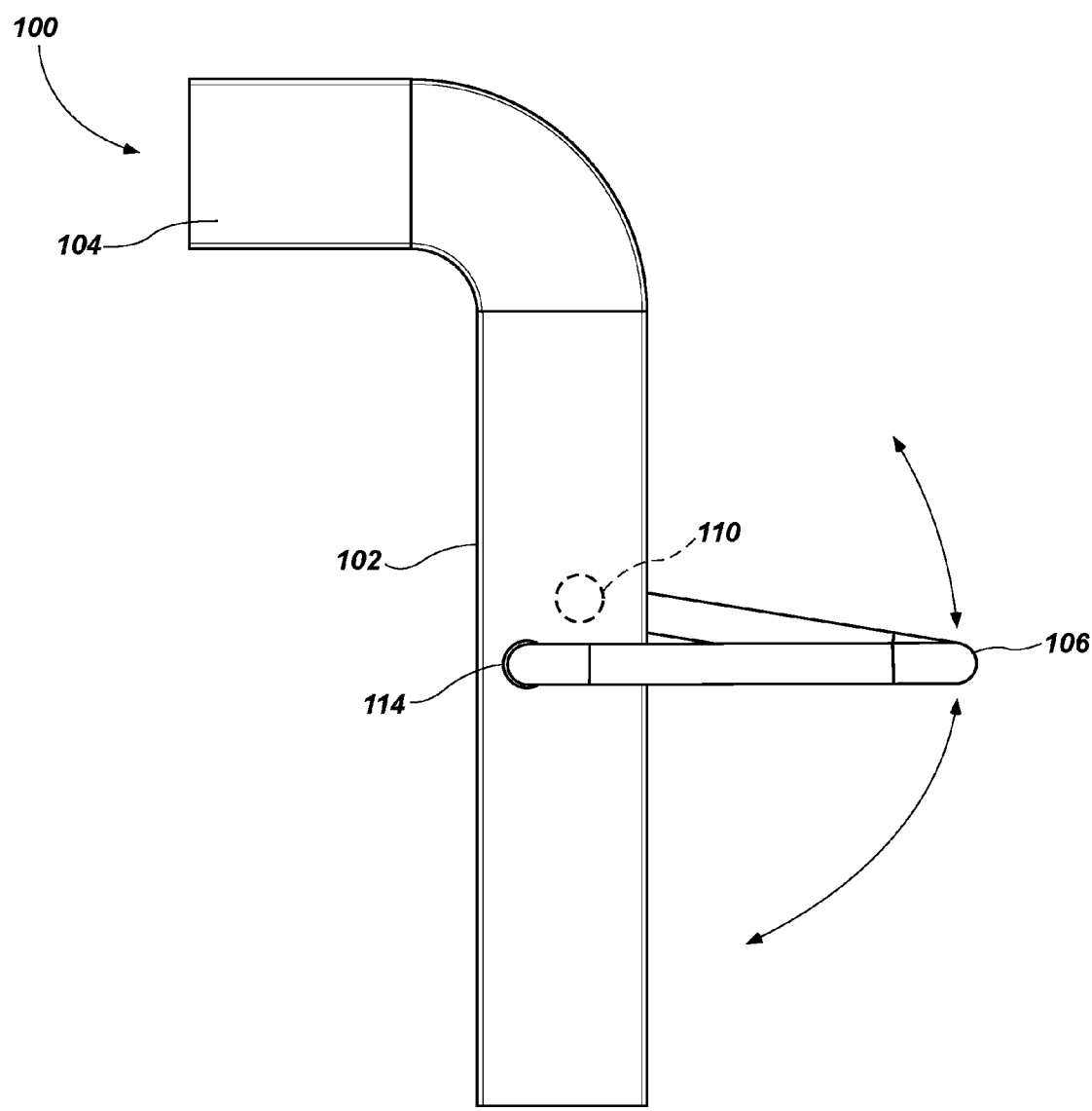
FIG. 5 is a side view of a pin with a clip in an intermediate position according to an embodiment of the present disclosure.

In an embodiment, a first bore 110 may extend into a first sidewall 112 of the pin 100. A second bore 114 may extend into a second sidewall 116 of the pin 100. The first sidewall 112 and the second sidewall 116 may be disposed on opposite, lateral sides of the long leg 102 of the pin 100. The first terminal end 120 of the clip 106 may be disposed in the first bore 110 and the second terminal end 122 of the clip 106 may be disposed in the second bore 114. The resilient nature of the clip 106 may secure the first end 120 and the second end 122 in their respective bores. As can be observed in FIG. 8, in an embodiment, the axes of the bores 110 and 114 may be offset horizontally. In an embodiment, the axes of the bore 110 (shown by a dashed line) and bore 114 may be offset vertically as seen in FIG. 5. In an embodiment, the axes of the bores 110 and 114 may be offset from each other both vertically and horizontally, or in a first direction and a second direction.

In an embodiment, the clip 106 may be substantially rectangular in shape. In an embodiment, the clip 106 may be hooped shaped. In an embodiment, the clip 106 may be circular shaped. In an embodiment, the clip 106 may include an optional finger loop as shown by the dashed lines 124 in FIG. 8.

Figure 4:
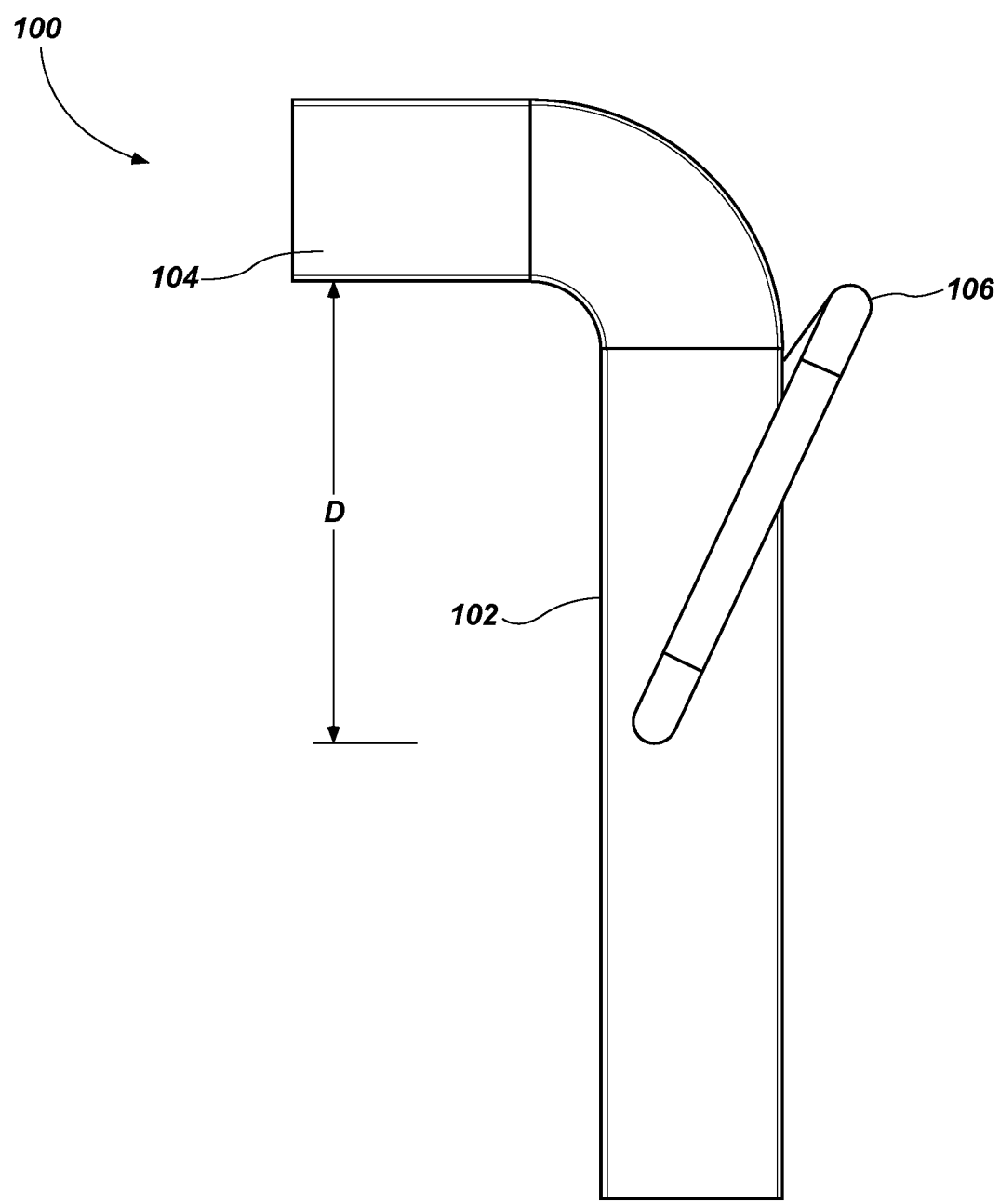
FIG. 4 is a side view of a pin with a clip in an unlocked position according to an embodiment of the present disclosure.
Figure 6:
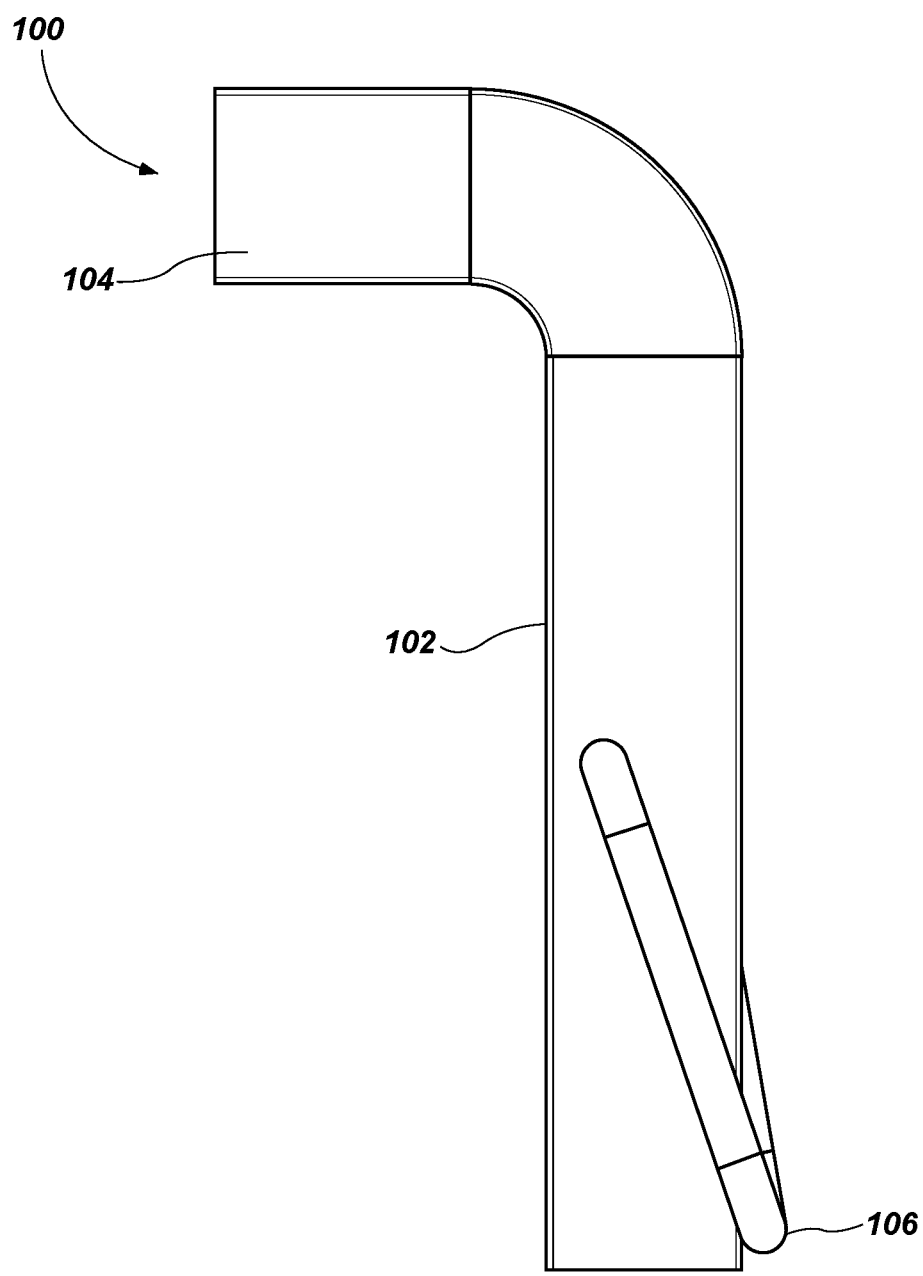
FIG. 6 is a side view of a pin with a clip in a locked position according to an embodiment of the present disclosure.
Figure 7:
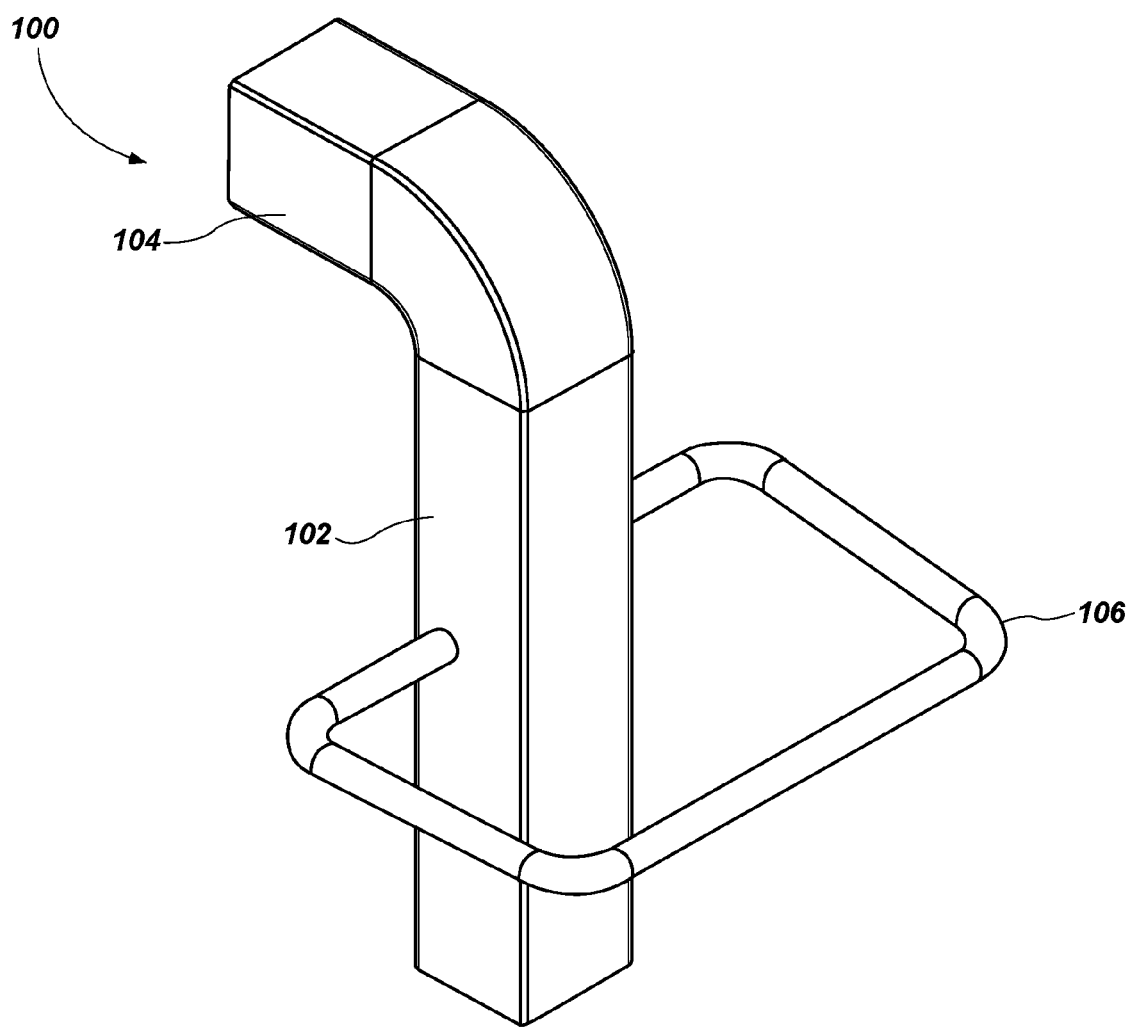
FIG. 7 is a perspective view of a pin with a clip in an intermediate position according to an embodiment of the present disclosure.
Figure 8:
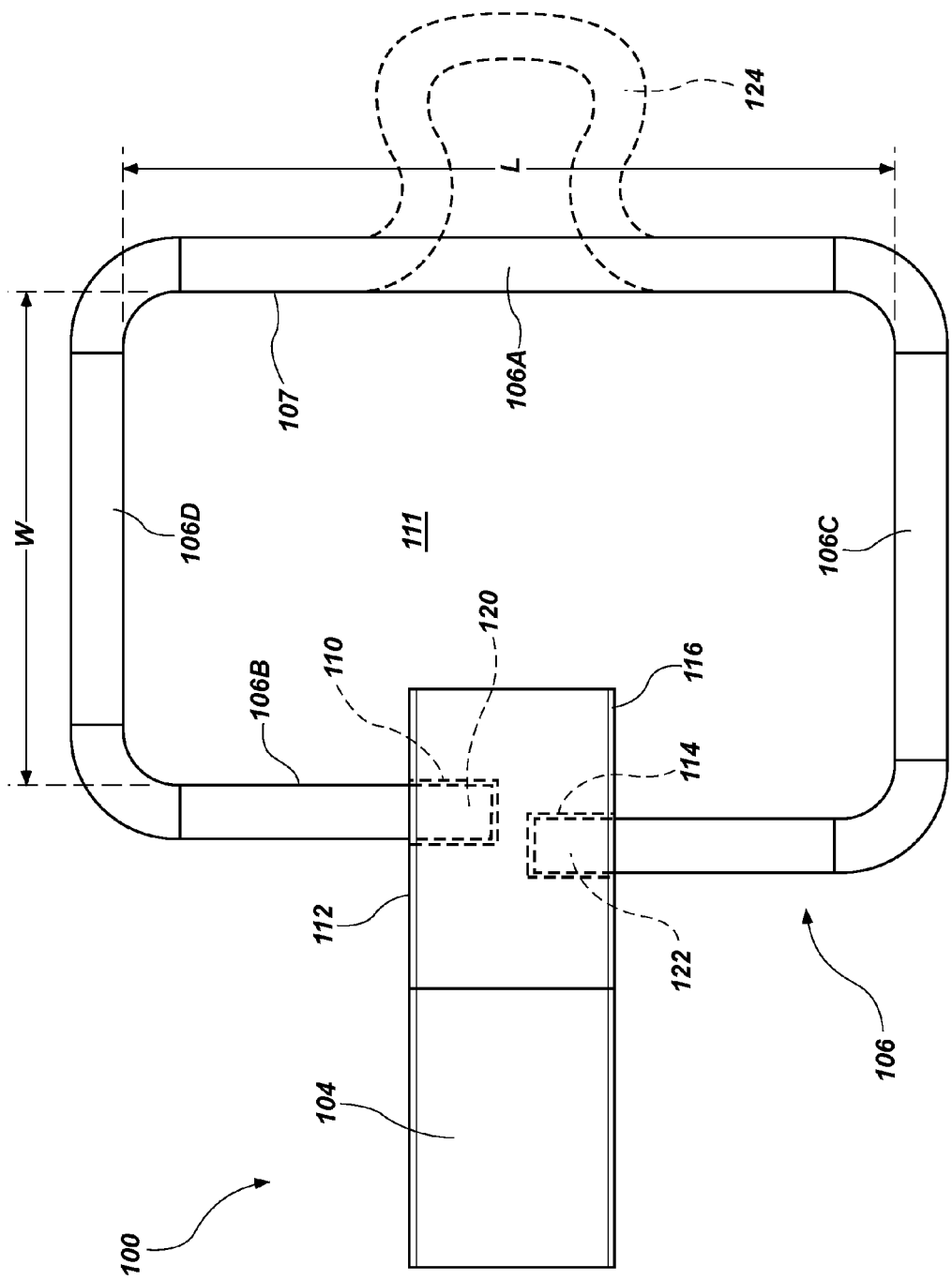
FIG. 8 is a top view of a pin with a clip in an intermediate position according to an embodiment of the present disclosure.

Referring now to FIGS. 4, 5 and 6, the clip 106 may be operable between an unlocked position as shown in FIG. 4 and a locked position as shown in FIG. 6. FIG. 5 depicts an intermediate position for the clip 106. In particular, the clip 106 may rotate between the unlocked position and the locked position as shown by the arrows in FIG. 5. The resilient nature of the clip 106 and the offset of the bores 110 and 114 may cause to clip 106 to remain in the unlocked position or the locked position. In this regard, the clip 106 may include a spring feature that maintains the clip 106 in the unlocked position or the locked position. The spring feature may be caused by the vertical and/or horizontal offset of the bores 110 and 114.

Figure 9:
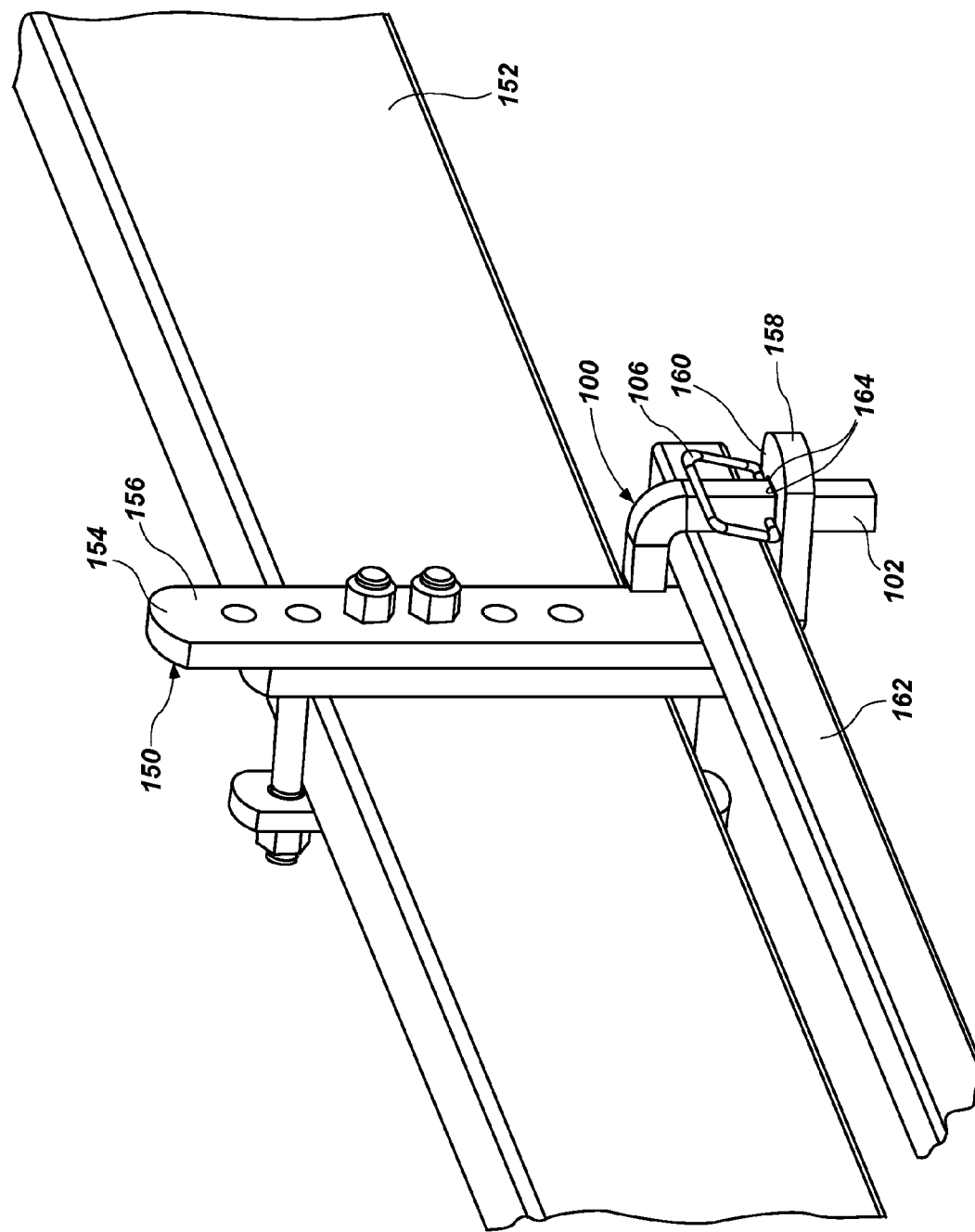
FIG. 9 depicts a bracket assembly mounted to a trailer tongue and a pin with a clip in an unlocked position according to an embodiment of the present disclosure.

Referring now to FIG. 9, there is shown a bracket assembly 150 mounted to a tongue 152 of a trailer (not shown). The bracket assembly 150 may include an L-shaped support member 154 (also referred to herein as a "spring bar support member") having a vertical portion 156 and a horizontal portion 158. The horizontal portion 158 may include an upper surface 160 that provides a support for a spring bar 162. Extending through the horizontal portion 158 may be a pin hole 164.

Installed in the pin hole 164 may be the pin 100. In particular, the long leg 102 of the pin 100 may be disposed in the pin hole 164. The clip 106 may abut against the upper surface 160 of the horizontal portion 158 to thereby define the limit of the progress of the long leg 102 through the pin hole 164. That is, the clip 106 prevents the pin 100 from dropping through the pin hole 164. As can be observed, the clip 106 is positioned in the unlocked position when the long leg 102 of the pin 100 is installed into the pin hole 164.

Figure 10:
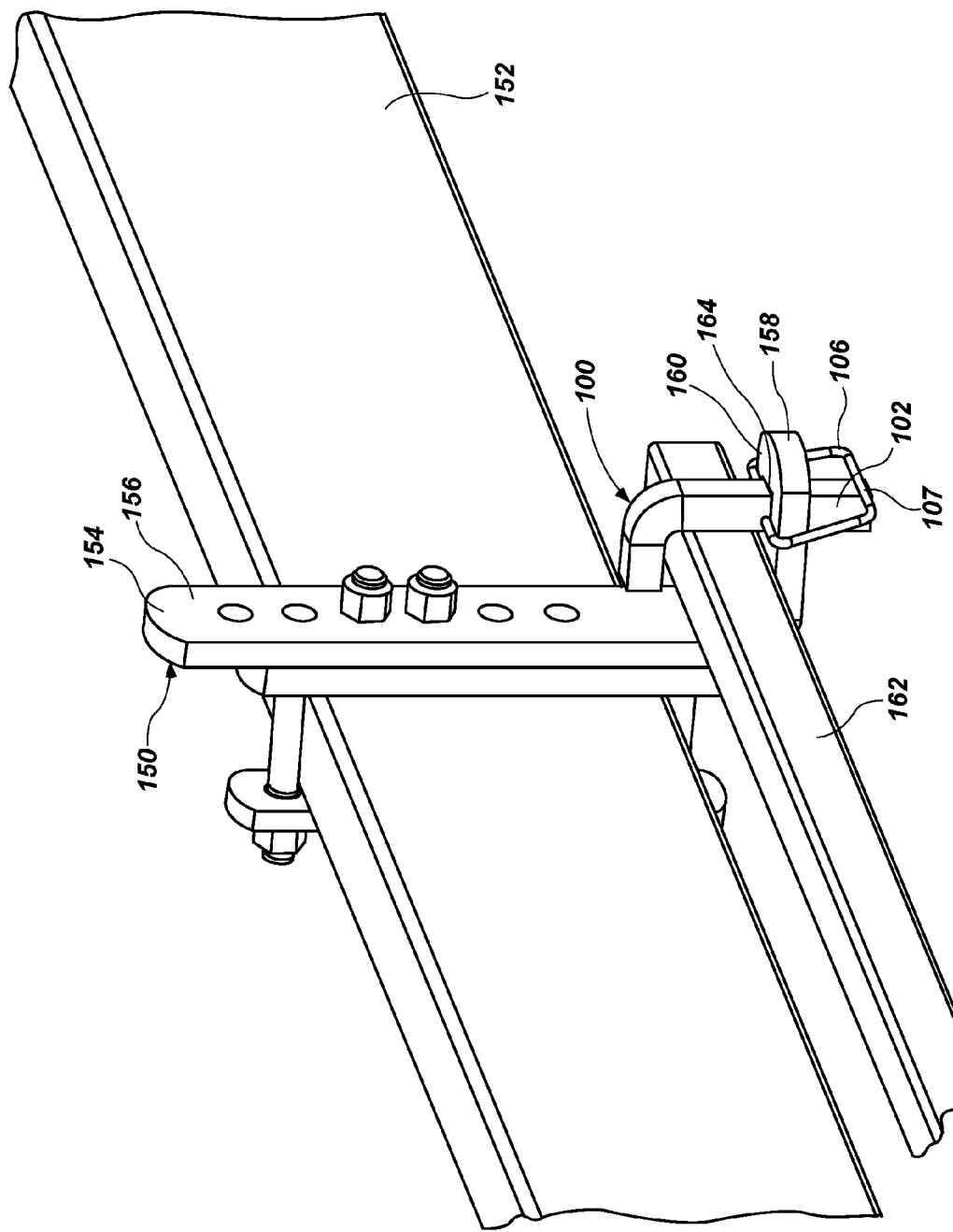
FIG. 10 depicts a bracket assembly mounted to a trailer tongue and a pin with a clip in an unlock position according to an embodiment of the present disclosure.

Referring now to FIG. 10, where like reference numerals depict like components, there is depicted the clip 106 in the locked position. As can be observed, in the locked position, the clip 106 passes over the horizontal portion 158 of the L-shaped member 154. The horizontal portion 158 then serves as a stop to engage an end member or stop portion 107 of the clip 106 to thereby prevent the pin 100 from disengaging the pin hole 164.

It will be appreciated that although the pin 100 is shown as an inverted L-shaped, that the pin 100 may be some other shape. In an embodiment, the pin 100 may be substantially straight. In an embodiment, the pin 100 may be curved or rounded.

Referring to FIGS. 4 and 10, a distance, D, between the mounting bores for the clip 106 and the horizontal leg 104 of the pin 100 may be greater than 1.5 inches, or between 1.0 and 2.0 inches. Thus, the horizontal leg 104 may not contact the spring bar 162 because the clip 106 may abut against the upper surface 160 of the horizontal portion 158 of the L-shaped member 154. It will be appreciated that this feature reduces noise as any contact between a pin and a spring arm may produce chattering as the spring arm moves forward and backward while the tow vehicle is in motion.

Referring back to FIG. 8, a width, W, of the opening defined by the clip 106 may be about 1.375 inches, or between 0.75 and 1.75 inches. A length, L, of the opening defined by the clip 106 may be about 2.25 inches, or between 1.75 and 2.75 inches. It will be appreciated that there is criticality to the width, W, of the opening defined by the clip 106. In particular, the width, W, allows the pin 100 to rise up when the spring arm pushes on the pin 100. This can happen during a turn or when traveling on uneven terrain. Further, the width, W, allows the clip 106 to clear the edge of the horizontal portion 158 of the L-shaped member 154. In an embodiment, the clip 106 may define a bail.

An embodiment of a trailer hitch system according to the present disclosure comprises:

a spring bar joined with a hitch head and exerting a force on said hitch head;

a bracket for joining said spring bar to a trailer, said bracket having a horizontal portion having a pin receiving hole formed therein, the horizontal portion forming a spring bar support surface;

a pin having an elongated portion removably insertable into said pin receiving hole; and a clip mounted to said pin, the clip having an elongated portion;

wherein said clip is rotatably operable between a locked position and an unlocked position;

wherein the elongated portion of the clip is disposed under the horizontal portion when the clip is in the locked position;

wherein the elongated portion of the clip is disposed above the horizontal portion when the clip is in the unlocked position.

The above disclosed embodiment, wherein the clip forms a stop that limits a distance that the elongated portion of the pin extends through the pin receiving hole.

The above disclosed embodiment, wherein the clip comprises a contiguous, elongated body member that extends between a first end and a second end.

The above disclosed embodiment, wherein the body member defines a bail.

The above disclosed embodiment, wherein the first end and the second end of the clip are mounted in bores disposed on opposing sides of the pin.

The above disclosed embodiment, wherein axes of the bores are offset from each other.

The above disclosed embodiment, wherein a width of an aperture defined by the clip is about 1.375 inches.

The above disclosed embodiment, wherein a length of an aperture defined by the clip is about 2.25 inches.

The above disclosed embodiment, wherein the clip comprises a finger loop.

The above disclosed embodiment, wherein the pin is straight.

The above disclosed embodiment, wherein the pin forms an inverted L-shape.

The above disclosed embodiment, wherein an axis of rotation of the clip is perpendicular to a longitudinal axis of the elongated portion of the pin.

The above disclosed embodiment, wherein a portion of the clip abuts against the spring bar support surface of the horizontal portion to limit a distance that the elongated portion extends through the pin receiving hole.

An embodiment of the present disclosure may include n apparatus for use in securing a spring arm to a bracket assembly attached to a trailer tongue, said apparatus comprising a shaft member having a first bore and a second bore formed therein; a clip member defining a bail, the bail extending between a first terminal end to a second terminal end; wherein the first terminal end of the bail is disposed in the first bore and the second terminal end of the bail is disposed in the second bore; wherein the bail of the clip member is operable between an unlocked position and a locked position.

In an embodiment, the first bore and the second bore are offset from each other in a first direction. In an embodiment, the first bore and the second bore are offset from each other in a second direction. In an embodiment, a cross-section of the shaft member is one of rectangular, square and circular. In an embodiment, the shaft member comprises an inverted L-shaped having a long leg and a short leg. In an embodiment, the shaft member consists of a straight leg only. In an embodiment, the first bore and the second bore are formed in opposite sides of the long leg. In an embodiment, the clip member comprises a spring feature to maintain the clip member in the locked position. In an embodiment, the clip member comprises a spring feature to maintain the clip member in the unlocked position.

An embodiment of the present disclosure may comprise bracket assembly for supporting a spring bar extending from a hitch head, said bracket assembly comprising: a spring bar support member; a mounting assembly for mounting the spring bar support member to a trailer frame; a pin hole formed in the spring bar support member; a pin having a shaft member configured and dimensioned to be installed in the pin hole; and a clip member rotatably mounted to the shaft member, the clip member defining a stop portion; wherein the clip member is operable between a locked position and an unlocked position; wherein the stop portion of the clip member is positioned above the spring bar support member when the clip member is in the unlocked position and the pin is installed in the pin hole; wherein the stop portion of the clip member is positioned below the spring bar support member when the clip member is in the locked position and the pin is installed in the pin hole.

In an embodiment, the clip member limits a depth of the pin in the pin hole. In an embodiment, the shaft member of the pin comprises a first bore and a second bore formed therein, wherein the clip member defines a bail, the bail extending between a first terminal end to a second terminal end, wherein the first terminal end of the bail is installed in the first bore of the shaft member and the second terminal end of the bail is installed in the second bore of the shaft member. In an embodiment, the first bore and the second bore are offset from each other in a first direction. In an embodiment, the first bore and the second bore are offset from each other in a second direction. In an embodiment, a cross-section of the shaft member is one of rectangular, square and circular. In an embodiment, the shaft member comprises one of an inverted L-shape having a long leg and a short leg and a straight leg. It will be appreciated that the shaft member may comprise any other shape. In an embodiment, the first bore and the second bore are formed in the long leg. In an embodiment, the first bore and the second bore are formed in opposite sides of the long leg. In an embodiment, the clip member comprises a spring feature to maintain the clip member in the locked position.

An embodiment of the present disclosure may comprise a trailer hitch assembly comprising: a spring bar joined with a hitch head and exerting a force on said hitch head; a bracket assembly for joining said spring bar to a trailer tongue, said bracket assembly having a horizontal portion having a pin receiving hole formed therein, the horizontal portion defining a spring bar support surface; a pin having a shaft member removably insertable into said pin receiving hole; and a clip member rotatably mounted to said pin, the clip member defining a stop portion; wherein said clip member is operable between a locked position and an unlocked position; wherein the stop portion of the clip member is disposed under the horizontal portion when the clip member is in the locked position; wherein the stop portion of the clip member is disposed above the horizontal portion when the clip member is in the unlocked position; wherein the clip member limits a distance that the shaft member of the pin extends through the pin receiving hole; wherein the clip member comprises a contiguous, elongated bail that extends between a first terminal end and a second terminal end; wherein the first terminal end and the second terminal end of the clip member are disposed in bores formed on opposing sides of the pin, each of the bores having an axis; wherein axes of the bores are offset from each other in a first direction and a second direction; wherein a width of an aperture defined by the bail of the clip member is about 1.375 inches; wherein a length of the aperture defined by the bail of the clip member is about 2.25 inches; wherein the clip member comprises a finger loop; wherein the shaft member of the pin defines an inverted L-shape; wherein a portion of the clip member abuts against the spring bar support surface of the horizontal portion to limit a distance that the shaft member extends through the pin receiving hole; wherein the clip member comprises a spring feature to maintain the clip member in the locked position.

Those having ordinary skill in the relevant art will appreciate the advantages provided by the features of the present disclosure. For example, it is a feature of the present disclosure to provide a trailer hitch system that is relatively simple in design and manufacture. Another feature of the present disclosure is to provide such a trailer hitch system that reduces trailer sway and equalizes loads. It is a further feature of the present disclosure, in accordance with one aspect thereof, to provide a trailer hitch system having brackets. It is an additional feature of the present disclosure to provide a trailer hitch system having pins with clips for securing the spring arms. It is an additional feature of the present disclosure to provide a trailer hitch system having L-shaped pins for securing the spring arms. It is an additional feature of the present disclosure to provide a trailer hitch system having pins with retaining clips for securing the spring arms. It is an additional feature of the present disclosure to provide a trailer hitch system having pins with retaining clips with finger loops for securing the spring arms.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claim is:

1. An apparatus for use in securing a spring arm to a bracket assembly attached to a trailer tongue, said apparatus comprising:
   a shaft member having a first bore and a second bore formed therein;
   a clip member defining a bail, the bail extending between a first terminal end to a second terminal end, the bail defining a stop portion; and
   the bracket assembly having a top end and a bottom end;
   wherein the first terminal end of the bail is disposed in the first bore and the second terminal end of the bail is disposed in the second bore;
   wherein the bail of the clip member is operable between an unlocked position and a locked position;
   wherein the stop portion of the bail is disposed below the bottom end of the bracket assembly when the bail is in the locked position.

2. The apparatus of claim 1, wherein the first bore and the second bore are offset from each other in a first direction.

3. The apparatus of claim 2, wherein the first bore and the second bore are offset from each other in a second direction.

4. The apparatus of claim 1, wherein a cross-section of the shaft member is one of rectangular, square, and circular.

5. The apparatus of claim 1, wherein the shaft member comprises one of (i) an inverted L-shaped having a long leg and a short leg, and (ii) a straight leg.

6. The apparatus of claim 5, wherein the first bore and the second bore are formed in the long leg.

7. The apparatus of claim 6, wherein the first bore and the second bore are formed in opposite sides of the long leg.

8. The apparatus of claim 1, wherein the clip member comprises a spring feature to maintain the clip member in the locked position.

9. The apparatus of claim 8, wherein the spring feature maintains the clip member in the unlocked position.

10. A bracket assembly for supporting a spring bar extending from a hitch head, said bracket assembly comprising:
    a spring bar support member;
    a mounting assembly for mounting the spring bar support member to a trailer frame;
    a pin hole formed in the spring bar support member;
    a pin having a shaft member configured and dimensioned to be installed in the pin hole; and
    a clip member rotatably mounted to the shaft member, the clip member defining a stop portion;
    wherein the clip member is operable between a locked position and an unlocked position;
    wherein the stop portion of the clip member is positioned above the spring bar support member when the clip member is in the unlocked position and the pin is installed in the pin hole;
    wherein the stop portion of the clip member is positioned below the spring bar support member when the clip member is in the locked position and the pin is installed in the pin hole.

11. The bracket assembly of claim 10, wherein the clip member limits a depth of the pin in the pin hole.

12. The bracket assembly of claim 10, wherein the shaft member of the pin comprises a first bore and a second bore formed therein, wherein the clip member defines a bail, the bail extending between a first terminal end to a second terminal end, wherein the first terminal end of the bail is installed in the first bore of the shaft member and the second terminal end of the bail is installed in the second bore of the shaft member.

13. The bracket assembly of claim 12, wherein the first bore and the second bore are offset from each other in a first direction.

14. The bracket assembly of claim 13, wherein the first bore and the second bore are offset from each other in a second direction.

15. The bracket assembly of claim 12, wherein a cross-section of the shaft member is one of rectangular, square and circular.

16. The bracket assembly of claim 12, wherein the shaft member comprises one of (i) an inverted L-shape having a long leg and a short leg, and (ii) a straight leg.

17. The bracket assembly of claim 16, wherein the first bore and the second bore are formed in the long leg.

18. The bracket assembly of claim 17, wherein the first bore and the second bore are formed in opposite sides of the long leg.

19. The bracket assembly of claim 10, wherein the clip member comprises a spring feature to maintain the clip member in the locked position.

20. A trailer hitch assembly comprising:
    a spring bar joined with a hitch head and exerting a force on said hitch head;
    a bracket assembly for joining said spring bar to a trailer tongue, said bracket assembly having a horizontal portion having a pin receiving hole formed therein, the horizontal portion defining a spring bar support surface;
    a pin having a shaft member removably insertable into said pin receiving hole; and
    a clip member rotatably mounted to said pin, the clip member defining a stop portion;
    wherein said clip member is operable between a locked position and an unlocked position;
    wherein the stop portion of the clip member is disposed under the horizontal portion when the clip member is in the locked position;
    wherein the stop portion of the clip member is disposed above the horizontal portion when the clip member is in the unlocked position;
    wherein the clip member limits a distance that the shaft member of the pin extends through the pin receiving hole;
    wherein the clip member comprises a contiguous, elongated bail that extends between a first terminal end and a second terminal end;
    wherein the first terminal end and the second terminal end of the clip member are disposed in bores formed on opposing sides of the pin, each of the bores having an axis;

wherein axes of the bores are offset from each other in a first direction and a second direction;

wherein a width of an aperture defined by the bail of the clip member is about 1.375 inches;

wherein a length of the aperture defined by the bail of the clip member is about 2.25 inches;

wherein the clip member comprises a finger loop;

wherein the shaft member of the pin defines an inverted L-shape;

wherein a portion of the clip member abuts against the spring bar support surface of the horizontal portion to limit a distance that the shaft member extends through the pin receiving hole;

wherein the clip member comprises a spring feature to maintain the clip member in the locked position.

21. An apparatus for use in securing a spring arm to a bracket assembly attached to a trailer tongue, said apparatus comprising:

a clip member defining a bail, the bail extending between a first terminal end to a second terminal end;

the bracket assembly comprising a horizontal portion;

a pin hole formed in the horizontal portion of the bracket assembly; and a pin disposed in the pin hole, the pin having a first bore and a second bore formed therein;

wherein the first terminal end of the bail is disposed in the first bore of the pin and the second terminal end of the bail is disposed in the second bore of the pin;

wherein the bail of the clip member is operable between an unlocked position and a locked position;

wherein the horizontal portion of the bracket assembly serves as a stop to engage a portion of the clip member, and thereby prevent the pin from disengaging the pin hole.

22. The apparatus of claim 21, wherein the horizontal portion of the bracket assembly comprises an upper surface and a lower surface, wherein the lower surface of the horizontal portion of the bracket assembly serves as a stop to engage a portion of the clip member, and thereby prevent the pin from disengaging the pin hole.

23. The apparatus of claim 22, wherein the upper surface and the lower surface of the horizontal portion of the bracket assembly are planer.

24. The apparatus of claim 22, wherein the upper surface and the lower surface of the horizontal portion of the bracket assembly are parallel.

\* \* \* \* \*